US010286747B2

(12) United States Patent
Tanaka et al.

(10) Patent No.: US 10,286,747 B2
(45) Date of Patent: May 14, 2019

(54) VEHICLE-HEIGHT CONTROL SYSTEM

(71) Applicants: TOYOTA JIDOSHA KABUSHIKI KAISHA, Toyota-shi (JP); AISIN SEIKI KABUSHIKI KAISHA, Kariya-shi (JP)

(72) Inventors: Shogo Tanaka, Toyota (JP); Hideki Ohashi, Chiryu (JP); Jun Tokumitsu, Toyota (JP); Ryo Kanda, Nissin (JP); Hirokazu Shiozaki, Anjo (JP); Tomoyuki Nakamura, Kariya (JP)

(73) Assignees: TOYOTA JIDOSHA KABUSHIKI KAISHA, Toyota-shi (JP); AISIN SEIKI KABUSHIKI KAISHA, Kariya-shi (JP)

( * ) Notice: Subject to any disclaimer, the term of this patent is extended or adjusted under 35 U.S.C. 154(b) by 151 days.

(21) Appl. No.: 15/465,115

(22) Filed: Mar. 21, 2017

(65) Prior Publication Data

US 2017/0274723 A1 Sep. 28, 2017

(30) Foreign Application Priority Data

Mar. 22, 2016 (JP) ................................ 2016-057100
Feb. 8, 2017 (JP) ................................ 2017-021520

(51) Int. Cl.
*B60G 17/052* (2006.01)
*B60G 17/019* (2006.01)
(Continued)

(52) U.S. Cl.
CPC ....... *B60G 17/0525* (2013.01); *B60G 17/019* (2013.01); *B60G 17/0155* (2013.01);
(Continued)

(58) Field of Classification Search
CPC ............ B60G 17/0525; B60G 17/0155; B60G 17/019; B60G 17/0523; F15B 11/16
(Continued)

(56) References Cited

U.S. PATENT DOCUMENTS 4,744,589 A * 5/1988 Buma ................. B60G 17/0165
280/5.514
4,836,575 A * 6/1989 Buma ................... B60G 17/033
280/124.157

(Continued)

FOREIGN PATENT DOCUMENTS

DE 10 2008 021818 A1 11/2009
DE 10 2012 001 734 A1 8/2013
(Continued)

OTHER PUBLICATIONS

U.S. Appl. No. 15/436,390, filed Feb. 17, 2017, US 2017/0274720 A1, Ikuhide Iyoda, et al.

*Primary Examiner* — Thomas E Lazo
*Assistant Examiner* — Richard C Drake
(74) *Attorney, Agent, or Firm* — Oblon, McClelland, Maier & Neustadt, L.L.P.

(57) ABSTRACT

A vehicle-height control system includes: a fluid supply and discharge device including a compressor configured to suck fluid, and a tank configured to supply the fluid; an actuator-side passage connected to the fluid supply and discharge device; a vehicle-height control actuator provided for a wheel and connected to the actuator-side passage via a vehicle-height control valve; and a vehicle height controller configured to control a vehicle height for the wheel by controlling the fluid supply and discharge device and the vehicle-height control valve to control supply and discharge of the fluid in the vehicle-height control actuator. The vehicle height controller includes a start controller configured to open the vehicle-height control valve after estab- (Continued)

lishing communication between the actuator-side passage and at least one of the tank and the compressor in a state in which the vehicle-height control valve is closed at a start of control of the vehicle height.

8 Claims, 13 Drawing Sheets

(51) Int. Cl.
    *B60G 17/015*     (2006.01)
    *F15B 11/16*     (2006.01)
    *B60R 25/01*     (2013.01)

(52) U.S. Cl.
    CPC .......... *B60G 17/0523* (2013.01); *F15B 11/16* (2013.01); *B60G 2202/152* (2013.01); *B60G 2202/412* (2013.01); *B60G 2202/42* (2013.01); *B60G 2400/50* (2013.01); *B60G 2500/204* (2013.01); *B60G 2500/2021* (2013.01); *B60G 2500/30* (2013.01); *B60R 25/01* (2013.01); *F15B 2211/426* (2013.01); *F15B 2211/6306* (2013.01); *F15B 2211/6652* (2013.01); *F15B 2211/7051* (2013.01); *F15B 2211/71* (2013.01); *F15B 2211/7656* (2013.01); *F15B 2211/78* (2013.01)

(58) Field of Classification Search
    USPC ............................................. 415/115; 60/420
    See application file for complete search history.

(56) References Cited

U.S. PATENT DOCUMENTS

| | | | | |
|---|---|---|---|---|
| 6,726,189 B2* | 4/2004 | Folchert | ............. | B60G 17/0523 267/64.16 |
| 6,824,145 B2* | 11/2004 | Behmenburg | .......... | B60C 23/10 152/416 |
| 7,097,166 B2* | 8/2006 | Folchert | ............. | B60G 17/0523 267/64.28 |
| 7,255,358 B2* | 8/2007 | Kim | ................... | B60G 17/0155 280/124.157 |
| 7,624,994 B2* | 12/2009 | Stegmann | ............ | B60G 17/052 280/124.161 |
| 8,448,951 B2* | 5/2013 | Hein | .................. | B60G 17/0523 280/124.16 |
| 8,532,875 B2* | 9/2013 | Engelhardt | ........ | B60G 17/0523 701/37 |
| 8,777,246 B2* | 7/2014 | Meier | ....................... | F17D 1/02 137/487.5 |
| 9,931,900 B2* | 4/2018 | Oishi | ..................... | B60G 11/27 |
| 10,086,672 B2* | 10/2018 | Ohashi | ................ | B60G 17/0523 |
| 2005/0012293 A1 | 1/2005 | Misawa | | |
| 2006/0049606 A1* | 3/2006 | Geiger | ............... | B60G 17/0155 280/124.157 |
| 2008/0054576 A1* | 3/2008 | Ilias | ................... | B60G 17/0525 280/5.514 |
| 2009/0079155 A1* | 3/2009 | Rehra | .................. | B60G 17/052 280/124.16 |
| 2009/0102154 A1* | 4/2009 | Jung | ..................... | B60G 15/12 280/124.159 |
| 2011/0049819 A1 | 3/2011 | Matthies et al. | | |
| 2013/0192681 A1 | 8/2013 | Meier | | |
| 2014/0241859 A1* | 8/2014 | Hein | .................. | B60G 17/0525 415/115 |
| 2015/0151600 A1 | 6/2015 | Suzuki et al. | | |
| 2015/0151601 A1 | 6/2015 | Kondo et al. | | |
| 2015/0151602 A1 | 6/2015 | Suzuki et al. | | |
| 2015/0151603 A1 | 6/2015 | Kondo et al. | | |
| 2015/0361940 A1* | 12/2015 | Ishii | ................... | B60G 17/0195 701/112 |

FOREIGN PATENT DOCUMENTS

| | | |
|---|---|---|
| EP | 1 484 204 A2 | 12/2004 |
| EP | 2 878 462 A2 | 6/2015 |
| EP | 2 878 463 A2 | 6/2015 |
| EP | 2 878 464 A2 | 6/2015 |
| EP | 2 878 465 A2 | 6/2015 |
| EP | 3 222 447 A1 | 9/2017 |
| JP | 3-70615 A | 3/1991 |
| JP | 2015-105016 A | 6/2015 |
| JP | 2017-95028 A | 6/2017 |
| JP | 2017-171016 A | 9/2017 |
| WO | WO 2004/087445 A1 | 10/2004 |

* cited by examiner

VEHICLE-HEIGHT CONTROL SYSTEM

CROSS REFERENCE TO RELATED APPLICATION

The present application claims priority from Japanese Patent Application Nos. 2017-21520 filed on Feb. 8, 2017, and 2016-057100 filed on Mar. 22, 2016, the disclosures of which are herein incorporated by reference in its entirety.

BACKGROUND

The following disclosure relates to a vehicle-height control system configured to control a vehicle height by controlling supply and discharge of fluid in a vehicle-height control actuator.

Patent Document 1 (Japanese Patent Application Publication No. 3-70615) discloses a vehicle-height control system including: a tank 22; an air-discharge valve 34; a passage L1 connected to the tank 22; an electromagnetic valve 21 provided on the passage L1; a passage L2 connected to the air-discharge valve 34; an electromagnetic valve 32 provided on the passage L2; and air spring devices 11-14 connected to the passage L1 and the passage L2 respectively via vehicle-height control valves 15-18. In this vehicle-height control system, in the case where up control for increasing a vehicle height is executed, the electromagnetic valve 21 and one or ones of the vehicle-height control valves 15-18 which correspond to control target wheels (e.g., the vehicle-height control valve 15 in this explanation) are opened (at S216 in FIG. 3 in Patent Document 1). In the case where down control for lowering the vehicle height is executed, the air-discharge valve 34, the electromagnetic valve 32, and the vehicle-height control valve 15 are opened (at S402 in FIG. 5 in Patent Document 1).

SUMMARY

Accordingly, an aspect of the disclosure relates to a vehicle-height control system capable of preventing or reducing an unintentional change in a vehicle height at a start of vehicle height control.

In one aspect of the disclosure, a vehicle-height control system is configured such that an actuator-side passage is connected to a fluid supply and discharge device including a tank and a compressor and such that a vehicle-height control actuator is connected to the actuator-side passage via a vehicle-height control valve. At a start of the vehicle height control, the vehicle-height control valve is switched to its closed state to its open state after establishment of communication between the actuator-side passage and an air supply and discharge device.

In the vehicle-height control system disclosed in Patent Document 1, in the case where the up control is executed, the electromagnetic valve 21 and the vehicle-height control valve 15 are opened. Thus, when an air pressure that is a pressure of air in a portion of the passage L1 which is located on an air-spring-device side of the electromagnetic valve 21 is lower than an air pressure in the air spring device 11, air is discharged from the air spring device 11 to the passage L1, resulting in lower vehicle height. Also, in the case where the down control is executed, the electromagnetic valves 32, 34 and the vehicle-height control valve 15 are opened. Thus, when an air pressure in a portion of the passage L2 which is located on an air-spring-device side of the electromagnetic valve 32 is higher than the air pressure in the air spring device 11, air is supplied from the passage L2 to the air spring device 11, resulting in higher vehicle height. Thus, an unintentional change of the vehicle height may be caused at the start of the vehicle height control in the vehicle-height control system disclosed in Patent Document 1.

In the present vehicle-height control system, in contrast, the communication between the actuator-side passage and the tank of the fluid supply and discharge device is established at the start of the up control in a state in which the vehicle-height control valve is closed. This operation increases a fluid pressure that is a pressure of fluid in the actuator-side passage. As a result, it is possible to make it difficult for the fluid to be discharged from the vehicle-height control actuator to the actuator-side passage when the vehicle-height control valve is thereafter switched from its closed state to its open state, thereby preventing or reducing lowering of the vehicle height. Also, the actuator-side passage is fluidically coupled with an intake-side portion of the compressor of the fluid supply and discharge device at the start of the down control, and the compressor is actuated. This operation lowers the fluid pressure in the actuator-side passage. As a result, it is possible to make it difficult for the fluid to be supplied from the actuator-side passage to the vehicle-height control actuator when the vehicle-height control valve is thereafter switched to its open state, thereby preventing or reducing increase in the vehicle height. The present vehicle-height control system as described above is capable of preventing or reducing an unintentional change of the vehicle height at the start of vehicle height control.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Hereinafter, there will be described a vehicle-height control system according to one embodiment by reference to the drawings. The present vehicle-height control system utilizes air as fluid.

Figure 1:
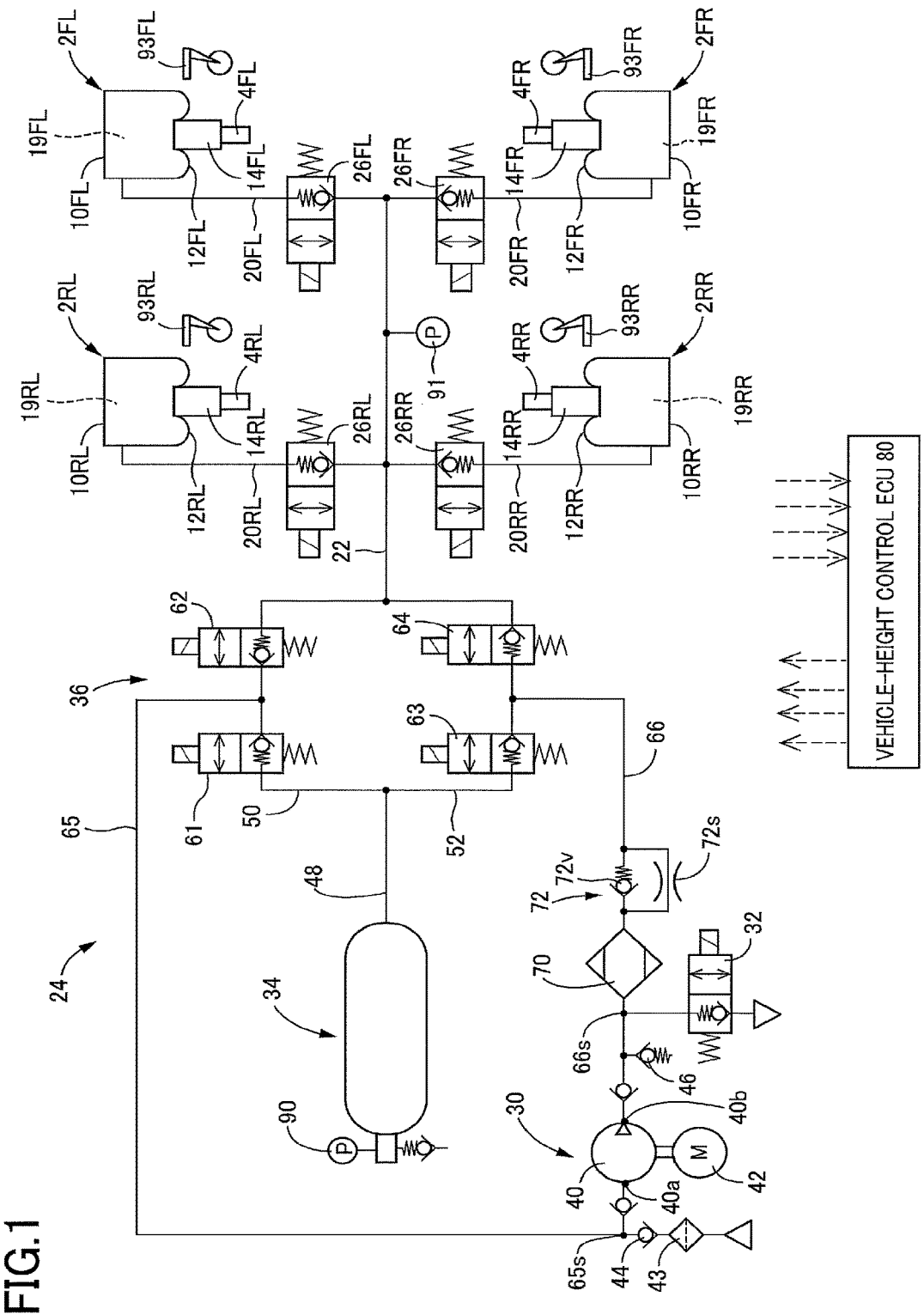
FIG. 1 is a circuit diagram of a vehicle-height control system according to one embodiment.

In the vehicle-height control system according to the embodiment, as illustrated in FIG. 1, air cylinders 2FL, 2FR, 2RL, 2RR each as a vehicle-height control actuator and shock absorbers 4FL, 4FR, 4RL, 4RR are provided in parallel between a wheel-side member and a vehicle-body-side member, not illustrated. The air cylinders 2FL, 2FR, 2RL, 2RR respectively correspond to front left, front right, rear left, and rear right wheels provided on a vehicle. Likewise, the shock absorbers 4FL, 4FR, 4RL, 4RR respectively correspond to the front left, front right, rear left, and rear right wheels. Each of the shock absorbers 4FL, 4FR, 4RL, 4RR includes an absorber body provided on the wheel-side member and an absorber piston provided on the vehicle-body-side member. In the following description, each of the air cylinders 2 and other similar components will be referred with a corresponding one of suffixes (FL, FR, RL, RR) indicative of the respective wheels where the air cylinders 2 and other similar component should be distinguished by their respective wheel positions. On the other hand, where these devices are collectively referred, or the distinction is not required, each of the air cylinders 2 and other similar components will be referred without such suffixes. Each of the air cylinders 2 includes: a cylinder body 10 provided on the vehicle-body-side member; a diaphragm 12 fixed to the cylinder body 10; and an air piston 14 provided on the diaphragm 12 and the absorber body of the corresponding shock absorber 4 so as to be immovable relative to the diaphragm 12 and the absorber body in the up and down direction. Interiors of these components serve as an air chamber 19 as a pressure medium chamber. When air is supplied to or discharged from the air chamber 19, the air piston 14 is moved relative to the cylinder body 10 in the up and down direction. This movement moves the absorber body and the absorber piston of the shock absorber 4 relative to each other in the up and down direction. As a result, a distance between the wheel-side member and the vehicle-body-side member is changed, that is, a vehicle height is changed.

An air supply and discharge device 24 as a fluid supply and discharge device is connected to the air chambers 19 of the respective air cylinders 2, via respective individual passages 20 and a common passage 22. Vehicle-height control valves 26 are provided on the respective individual passages 20. Each of the vehicle-height control valves 26 is a normally closed electromagnetic valve. When being in an open state, the vehicle-height control valve 26 allows flow of air in opposite directions. When being in a closed state, the vehicle-height control valve 26 prevents flow of air in a direction directed from the air chambers 19 to the common passage 22 but allows flow of air in the direction directed from the common passage 22 to the air chambers 19 when a pressure of air in the common passage 22 becomes higher than a pressure of air in the air chamber 19 by a set pressure.

The air supply and discharge device 24 includes a compressor device 30, an air discharge valve 32 as one example of a discharge valve, a tank 34, a switching device 36, an intake (suction) valve 44, and a relief valve 46. The compressor device 30 includes a compressor 40 and an electric motor 42 that drives the compressor 40 to operate it. When a discharge pressure of the compressor 40 has increased, air is discharged to the atmosphere via the relief valve 46. The tank 34 stores air in a pressurized state. A pressure of the air in the tank 34 (hereinafter may be referred to as "tank pressure") increases with increase in amount of air stored in the tank 34.

The switching device 36 is provided among the common passage 22, the tank 34, and the compressor device 30 to switch a direction in which air flows among them. As illustrated in FIG. 1, the common passage 22 and a tank passage 48 connected to the tank 34 are connected to each other by a first passage 50 and a second passage 52 which are provided in parallel. Circuit valves 61, 62 are provided on the first passage 50 in series. Circuit valves 63, 64 are provided on the second passage 52 in series. A third passage 65 is connected to the first passage 50 at a position located between the two circuit valves 61, 62 and connected to an intake-side portion 40a of the compressor 40. A fourth passage 66 is connected to the second passage 52 at a position located between the two circuit valves 63, 64 and connected to a discharge-side portion 40b of the compressor 40. Each of the circuit valves 61-64 is a normally closed valve. When being in an open state, each of the circuit valves 61-64 allows flow of air in opposite directions. When being in a closed state, each of the circuit valves 61-64 prevents flow of air from one side to the other side but allows flow of air from the other side to the one side when a pressure of air on the other side becomes higher than that on the one side by a set pressure. Each of the circuit valves 61, 63 in the closed state prevents air from flowing out of the tank 34. The circuit valve 62 in the closed state prevents air from flowing out of the common passage 22. The circuit valve 64 in the closed state prevents supply of air to the common passage 22.

The intake valve 44 is provided between a connecting portion 65s of the third passage 65 and the atmosphere. The intake valve 44 is a check valve that is closed when a pressure of air at the connecting portion 65s is equal to or higher than the atmospheric pressure and that is open when the pressure of air at the connecting portion 65s is lower than the atmospheric pressure. When the pressure of air at the connecting portion 65s becomes lower than the atmospheric pressure by the operation of the compressor 40, air is sucked from the atmosphere via a filter 43 and the intake valve 44. The air discharge valve 32 is connected to a connecting portion 66s of the fourth passage 66. The air-discharge valve 32 is a normally closed electromagnetic valve. When being in an open state, the air-discharge valve 32 allows discharge of air from the fourth passage 66 to the atmosphere. When being in a closed state, the air-discharge valve 32 prevents discharge of air from the fourth passage 66 to the atmosphere. The air-discharge valve 32 however allows supply of air from the atmosphere to the fourth passage 66 when a pressure of air in the fourth passage 66 becomes lower than the atmospheric pressure by a set pressure in the closed state. A dryer 70 and a flow restricting mechanism 72 are provided in series on the fourth passage 66 at positions located on a side of the connecting portion 66s which is located nearer to the second passage 52. The flow restricting mechanism 72 includes a pressure differential valve 72v and a restrictor 72s provided in parallel. The pressure differential valve 72v prevents flow of air from a second-passage side to a compressor side. When a pressure on the compressor side becomes higher than that on the second-passage side by a set pressure, the pressure differential valve 72v allows flow of air from the compressor 40 to the second passage 52.

Figure 2:
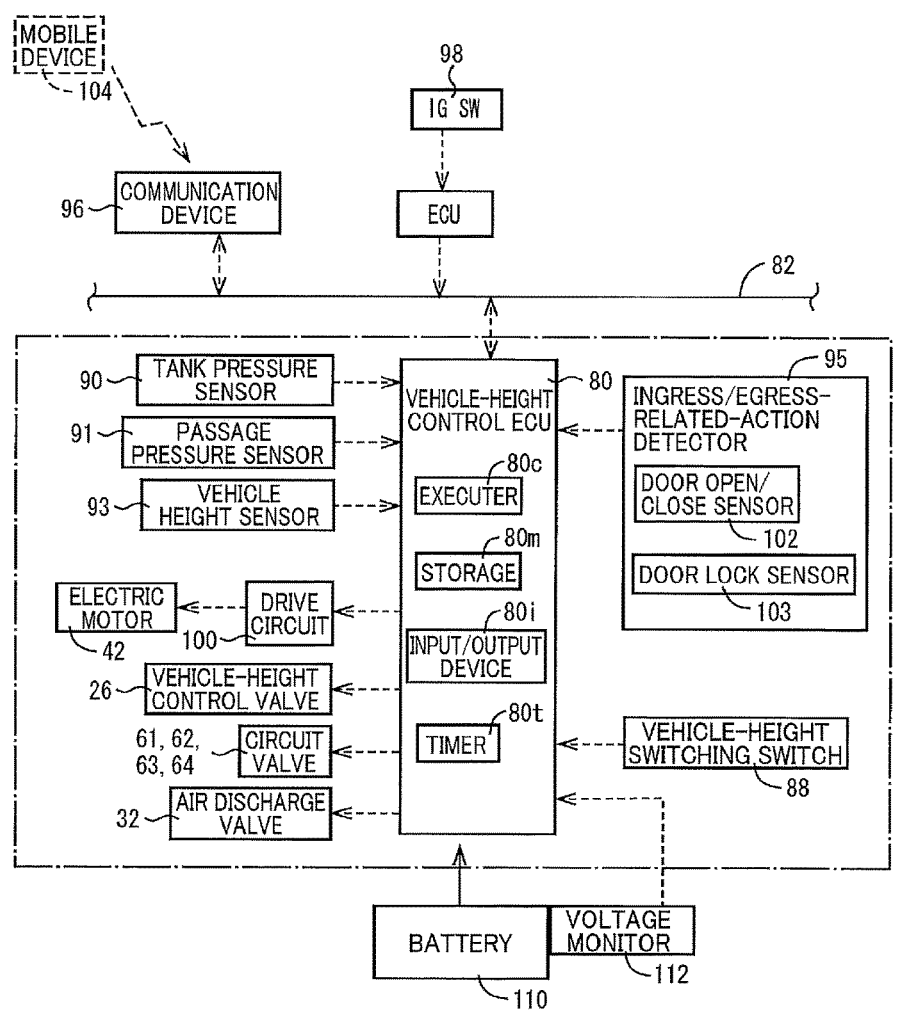
FIG. 2 is a conceptual view illustrating a vehicle-height control ECU and devices connected thereto in the vehicle-height control system.

In the present embodiment, the vehicle-height control system is controlled by a vehicle-height control electronic control unit (ECU) 80 mainly constituted by a computer. The vehicle-height control ECU 80 is communicable with devices, such as ECUs, via a controller area network (CAN) 82. As illustrated in FIG. 2, the vehicle-height control ECU 80 includes an executer 80c, a storage 80m, an input/output device 80i, and a timer 80t. Devices connected to the input/output device 80i include a vehicle-height switching switch 88, a tank pressure sensor 90, a passage pressure sensor 91, vehicle height sensors 93, and ingress/egress-related-action detectors 95. Also, devices including a communication device 96 and an ignition switch 98 are connected to the input/output device 80i via the CAN 82. The electric motor 42 is connected to the input/output device 80i via a drive circuit 100. The air-discharge valve 32, the vehicle-height control valves 26, and the circuit valves 61-64 are connected to the input/output device 80i.

A driver operates the vehicle-height switching switch 88 to instruct a change of the vehicle height to one of "L" (Low), "N" (Normal), and "H" (High). The tank pressure sensor 90 detects the tank pressure. The passage pressure sensor 91 is provided on the common passage 22 to detect a pressure of air in the common passage 22 in a state in which all the vehicle-height control valves 26 are closed. Strictly, the passage pressure sensor 91 detects a pressure of air in the common passage 22 and portions of the respective individual passages 20 which are located nearer to the common passage 22 than the respective vehicle-height control valves 26. This pressure may be hereinafter referred to as "passage pressure" and "passage pressure of the common passage 22". The vehicle height sensors 93 are provided for the respective wheels 2FL, 2FR, 2RL, 2RR. Each of the vehicle height sensors 93 detects a vehicle height which is a distance between the vehicle-body-side member and the wheel-side member, i.e., a height of the vehicle-body-side member from the wheel-side member. The ingress/egress-related-action detectors 95 detect the presence or absence of operation relating to getting on and off of the vehicle. The ingress/egress-related-action detectors 95 are provided respectively for a plurality of doors provided on the vehicle. Each of the ingress/egress-related-action detectors 95 includes: a door open/close sensor (a courtesy lamp sensor) 102 that detects opening and closing of a corresponding one of the doors; and a door lock sensor 103 that detects a locking operation and an unlocking operation for the corresponding door. Getting on and off and intention of start of driving are estimated based on opening and closing of the door and the locking and unlocking operations for the door, for example. The communication device 96 communicates with a mobile device 104 owned by, e.g., the driver in a predetermined communicable area. The locking and unlocking operations for the door may be performed based on the communication of the communication device 96. In the present embodiment, the vehicle-height control system is operable by electric power provided from a battery 110. The voltage of the battery 110 is detected by a voltage monitor 112 that is connected to the vehicle-height control ECU 80.

In the vehicle-height control system according to the present embodiment, a target vehicle height is determined for each of the front left and right and rear left and right wheels based on a running state of the vehicle. The air supply and discharge device 24 and the vehicle-height control valves 26 are controlled such that an actual vehicle height is brought closer to the target vehicle height for each wheel. The vehicle height control is also executed in the case where a predetermined condition is satisfied. Examples of this case include: a case where the vehicle-height switching switch 88 is operated; a case where it is estimated that a person is to get on or off the vehicle, and a case where a predetermined length of time is elapsed after egress. The vehicle height control is started when it is determined that an initiating condition for the vehicle height control (up control and down control) is satisfied. For example, it is determined that the initiating condition is satisfied, in the case where a deviation which is a difference between the actual vehicle height and the target vehicle height determined based on a running state is greater than or equal to a set value or in the case where a deviation between the actual vehicle height and the vehicle height instructed using the vehicle-height switching switch 88 is greater than or equal to a set value.

Figure 3:
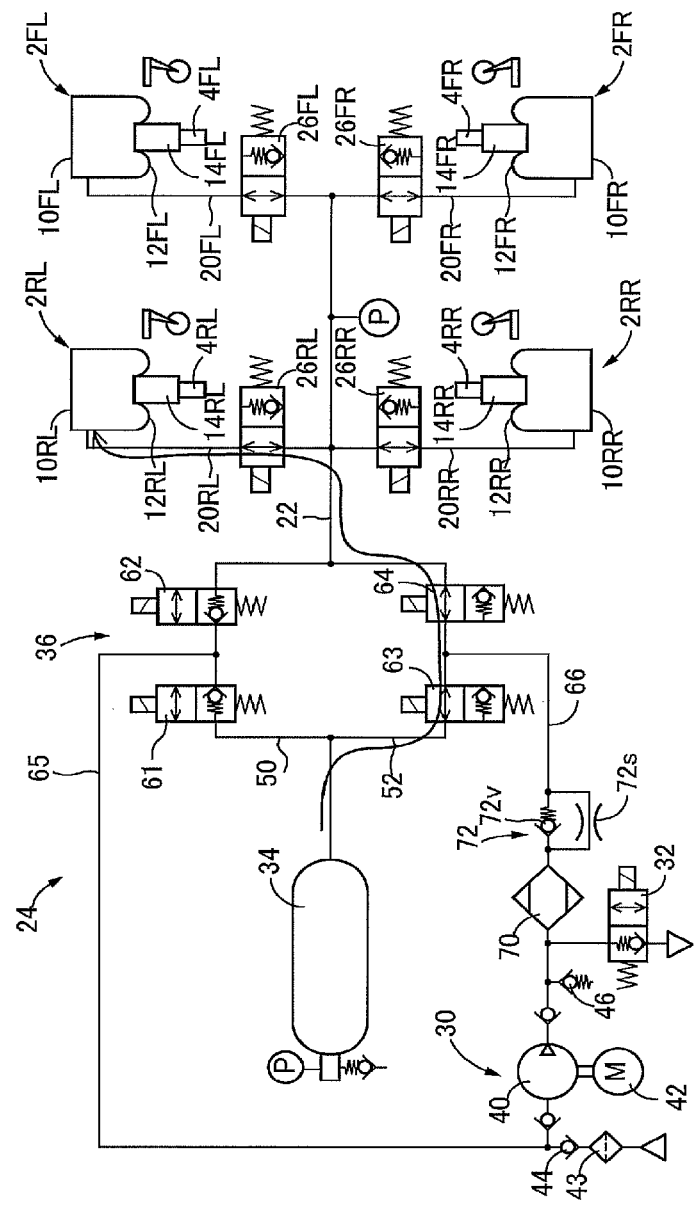
FIG. 3 is a view illustrating a state in which up control is executed in the vehicle-height control system.

For example, in the case where the vehicle height control for increasing the vehicle height (noted that this control may be hereinafter referred to as "the up control"), as illustrated in FIG. 3, the circuit valves 61, 62 are closed, the circuit valves 63, 64 are opened, and the vehicle-height control valve 26 corresponding to each control target wheel is opened. In FIG. 3, the front left and right and rear left and right wheels are control target wheels, but the following explanation will be provided for one of the control target wheels for simplicity. The air stored in the tank 34 is supplied to the air chamber 19 defined in the air cylinder 2 provided for the control target wheel. As a result, the vehicle height for the control target wheel is increased. It is possible to consider the case where the circuit valves 63, 64 are open during the up control as illustrated in FIG. 3 and the case where the circuit valves 61-64 are open during the up control though not illustrated. The flow rate of air supplied from the tank 34 to the common passage 22 is less in the former case than in the latter case. Thus, the vehicle-height control system may be configured such that the circuit valves 61-64 are open during the up control in the case where a quick increase in the vehicle height is requested, and the circuit valves 63, 64 are open during the up control as illustrated in FIG. 3 in the case where a quick increase in the vehicle height is not requested.

Figure 4:
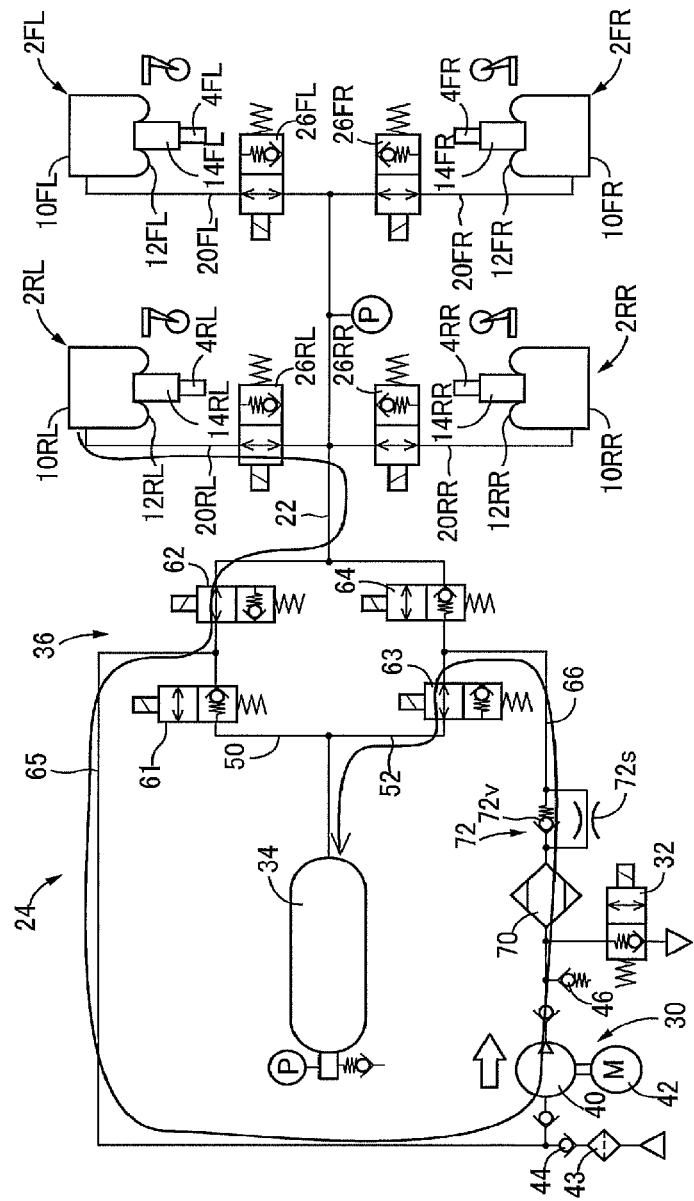
FIG. 4 is a view illustrating a state in which down control is executed in the vehicle-height control system.

In the case where the vehicle height control for lowering the vehicle height (noted that this control may be hereinafter referred to as "down control") is executed, as illustrated in FIG. 4, the ECU 80 drives the electric motor 42 to actuate the compressor 40, closes the circuit valves 61, 64, opens the circuit valves 62, 63, and opens the vehicle-height control valves 26 corresponding to the respective control target wheels. Air is discharged from the air chambers 19 of the air cylinders 2 provided for the respective control target wheels and supplied to the tank 34. This operation lowers the vehicle height of each control target wheel.

Figure 12:
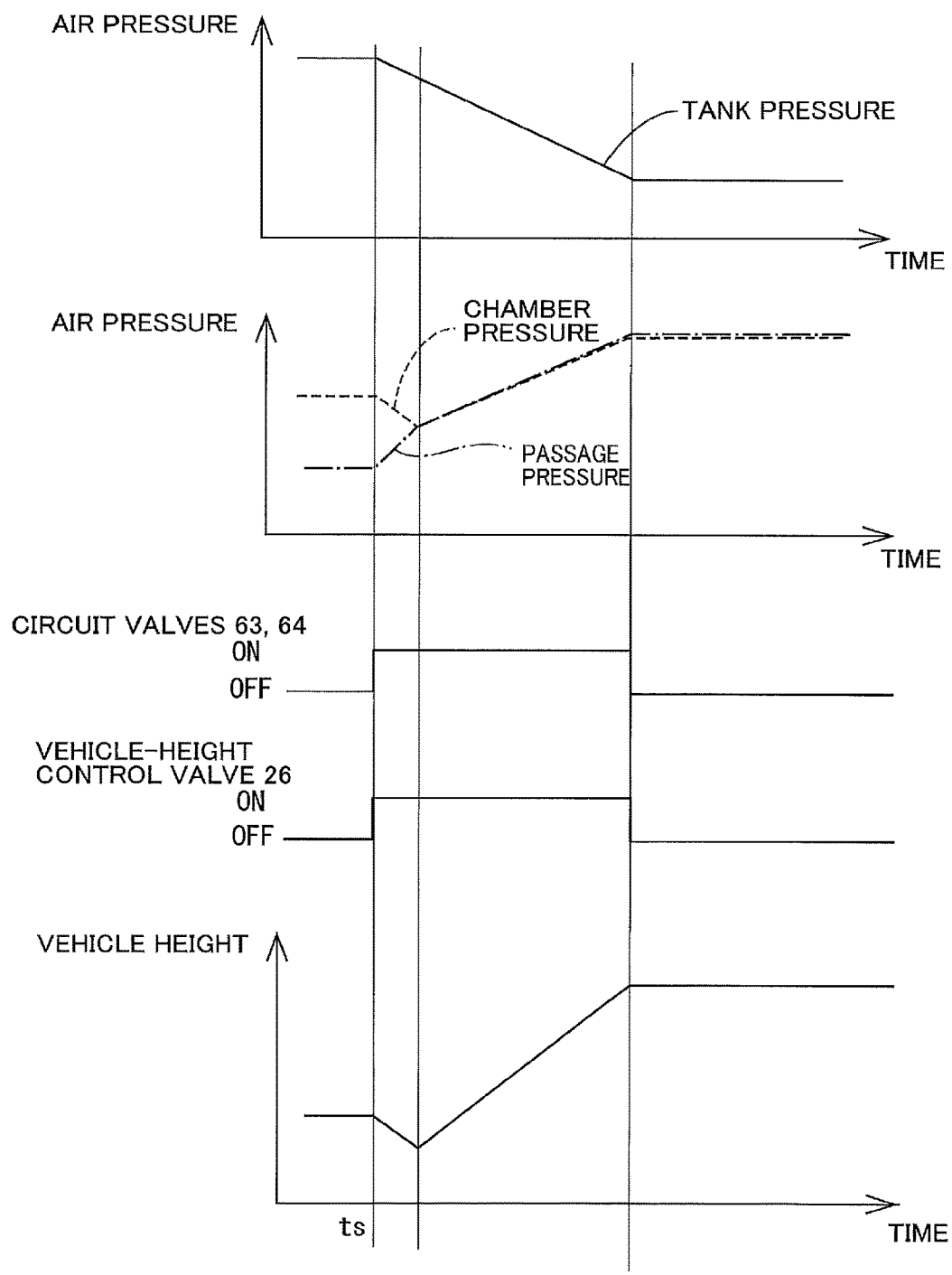
FIG. 12 is a view illustrating operations in the case where up control is executed in a conventional vehicle-height control system.

As illustrated in FIG. 12, when the initiating condition for the up control is satisfied (at Time ts), the circuit valves 63, 64 and the vehicle-height control valves 26 are opened. In this case, when a chamber pressure Pc that is a pressure of the air in the air chamber 19 of the air cylinder 2 is greater than a passage pressure Ps, the air is discharged from the air chamber 19 to the common passage 22, so that the vehicle height is lowered. That is, unintentional lowering of the vehicle height is caused at the start of the up control.

In the case where a quick increase in the vehicle height is not requested, as illustrated in FIG. 3, the circuit valves 63, 64 are opened in the up control. However, the flow rate of the air supplied from the tank 34 to the common passage 22 is less in the case where the circuit valves 63, 64 are opened than in the case where the circuit valves 61-64 are opened, resulting in delay in increasing the passage pressure Ps. Thus, the passage pressure Ps tends to be low with respect to the chamber pressure Pc at the start of the up control, leading to increased possibility of unintentional lowering of the vehicle height.

The tank pressure is in most cases controlled to fall within a predetermined range. In the case where the tank pressure is excessively high, however, air discharge control is executed to discharge air from the tank 34 to the atmosphere. In the air discharge control, the circuit valve 63 and the air discharge valve 32 are opened to establish communication between the tank 34 and the atmosphere via the fourth passage 66. As a result, the air pressure in the fourth passage 66 is lowered. In the case where, after the air discharge control, the initiating condition for the up control is satisfied, and the circuit valves 63, 64 are opened, the tank pressure flows to the fourth passage 66, making it difficult for the air to be supplied to the common passage 22. Thus, the passage pressure Ps tends to be low with respect to the chamber pressure Pc at the start of the up control, leading to increased possibility of unintentional lowering of the vehicle height.

Figure 13:
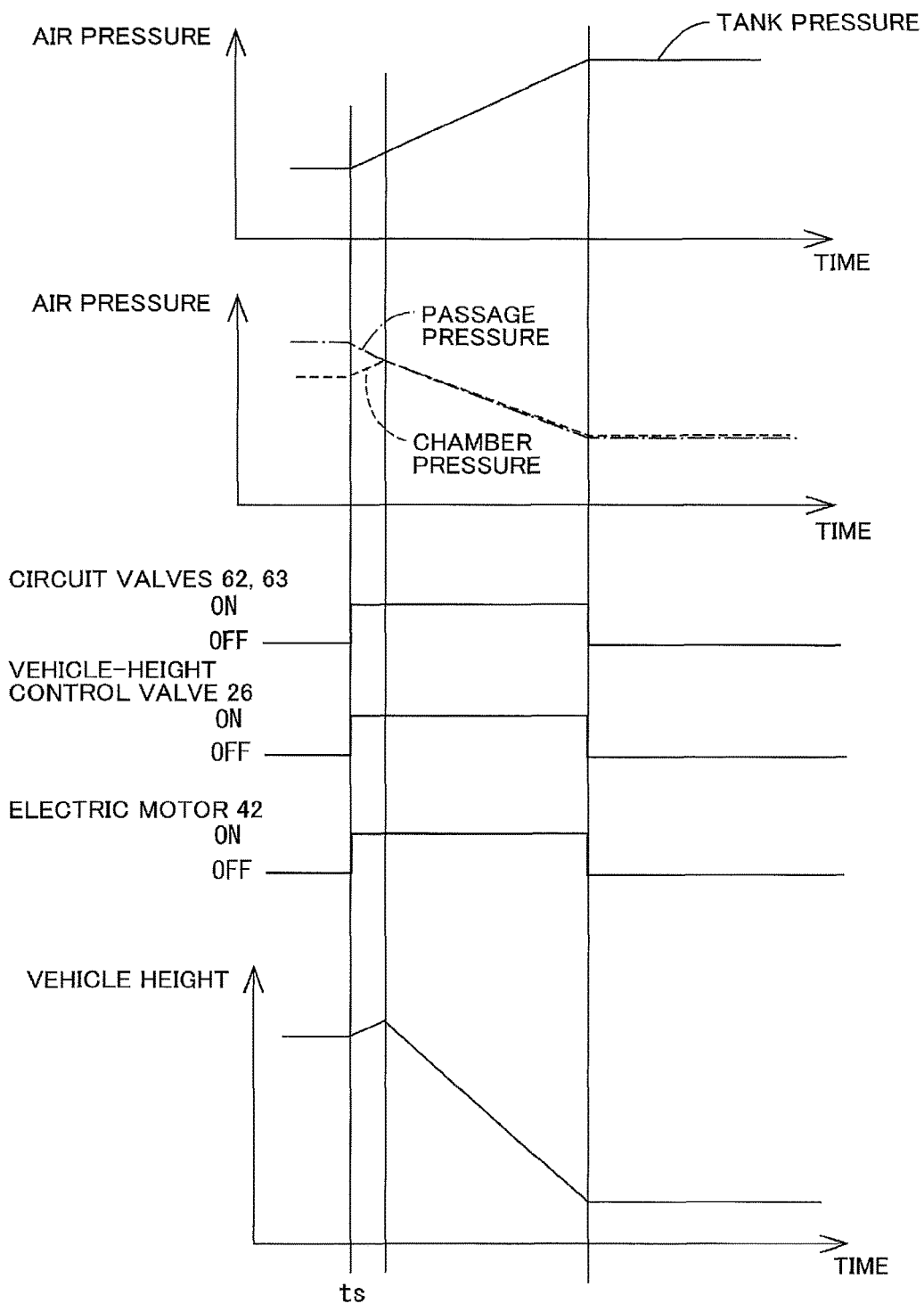
FIG. 13 is a view illustrating operations in the case where down control is executed in the conventional vehicle-height control system.

As illustrated in FIG. 13, when an initiating condition for the down control is satisfied (at Time ts), the circuit valves 62, 63 are opened, the compressor 40 is actuated by turning on the electric motor 42, and the vehicle-height control valves 26 are opened. In this case, when the passage pressure Ps is greater than the chamber pressure Pc, air is supplied from the common passage 22 to the air chamber 19, resulting in increase in the vehicle height. That is, the vehicle height is increased at the start of the down control, leading to increased possibility of unintentional increase in the vehicle height. For example, in the case where the down control is executed for the front left wheel after the up control is executed for the front right wheel, the passage pressure Ps is some case greater than the chamber pressure Pc in the air cylinder 2FL provided for the front left wheel. In this case, air may be supplied from the common passage 22 to the air chamber 19FL at the start of the down control, which may lead to unintentional increase in the vehicle height.

Figure 5:
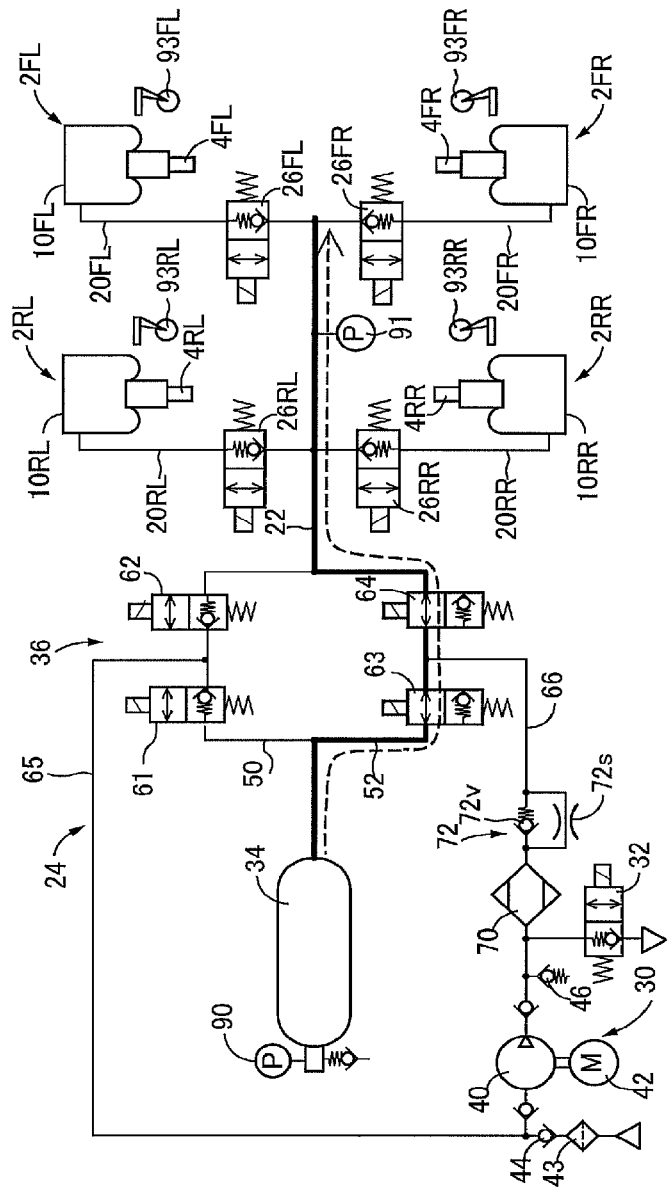
FIG. 5 is a view illustrating a state in which up start control is executed in the vehicle-height control system.
Figure 6:
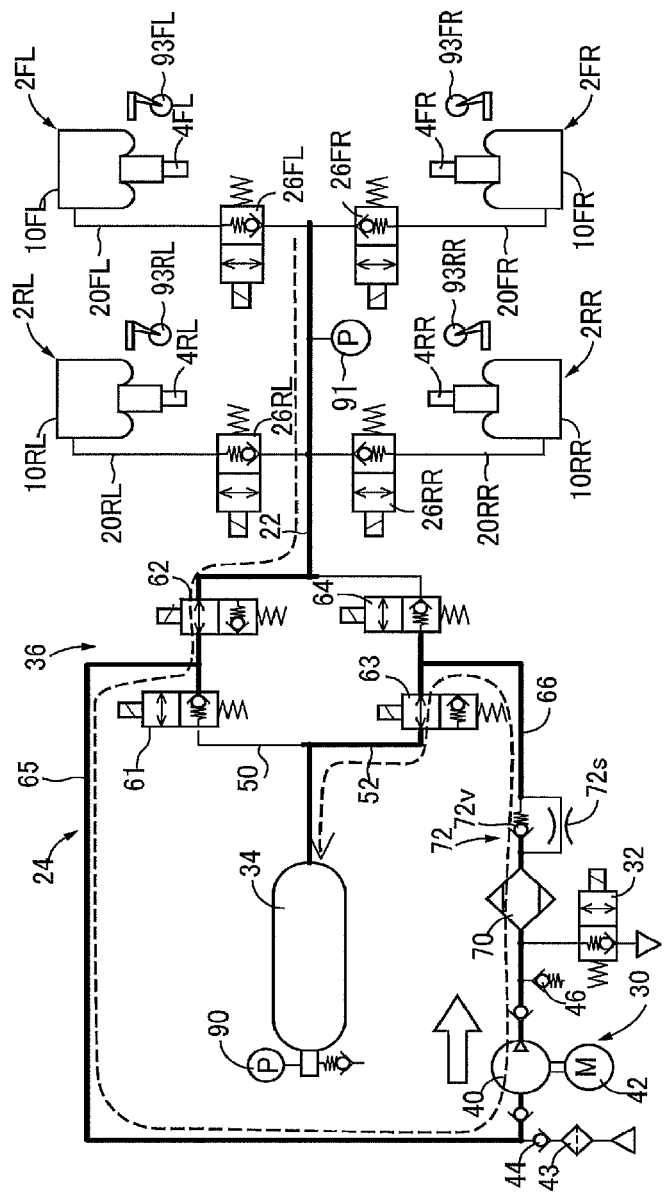
FIG. 6 is a view illustrating a state in which down start control is executed in the vehicle-height control system.

To solve this problem, in the present embodiment, start control is executed when the initiating condition for the vehicle height control is satisfied. In up start control as start control for the up control, the state illustrated in FIG. 5 is established in which the vehicle-height control valves 26 are closed, and communication between the tank 34 and the common passage 22 is established. As a result, the passage pressure Ps is increased. In down start control as start control for the down control, the state illustrated in FIG. 6 is established in which the vehicle-height control valves 26 are closed, communication between the common passage 22 and the intake-side portion 40a of the compressor 40 is established, and the compressor 40 is operated. As a result, the passage pressure Ps is lowered.

Figure 7:
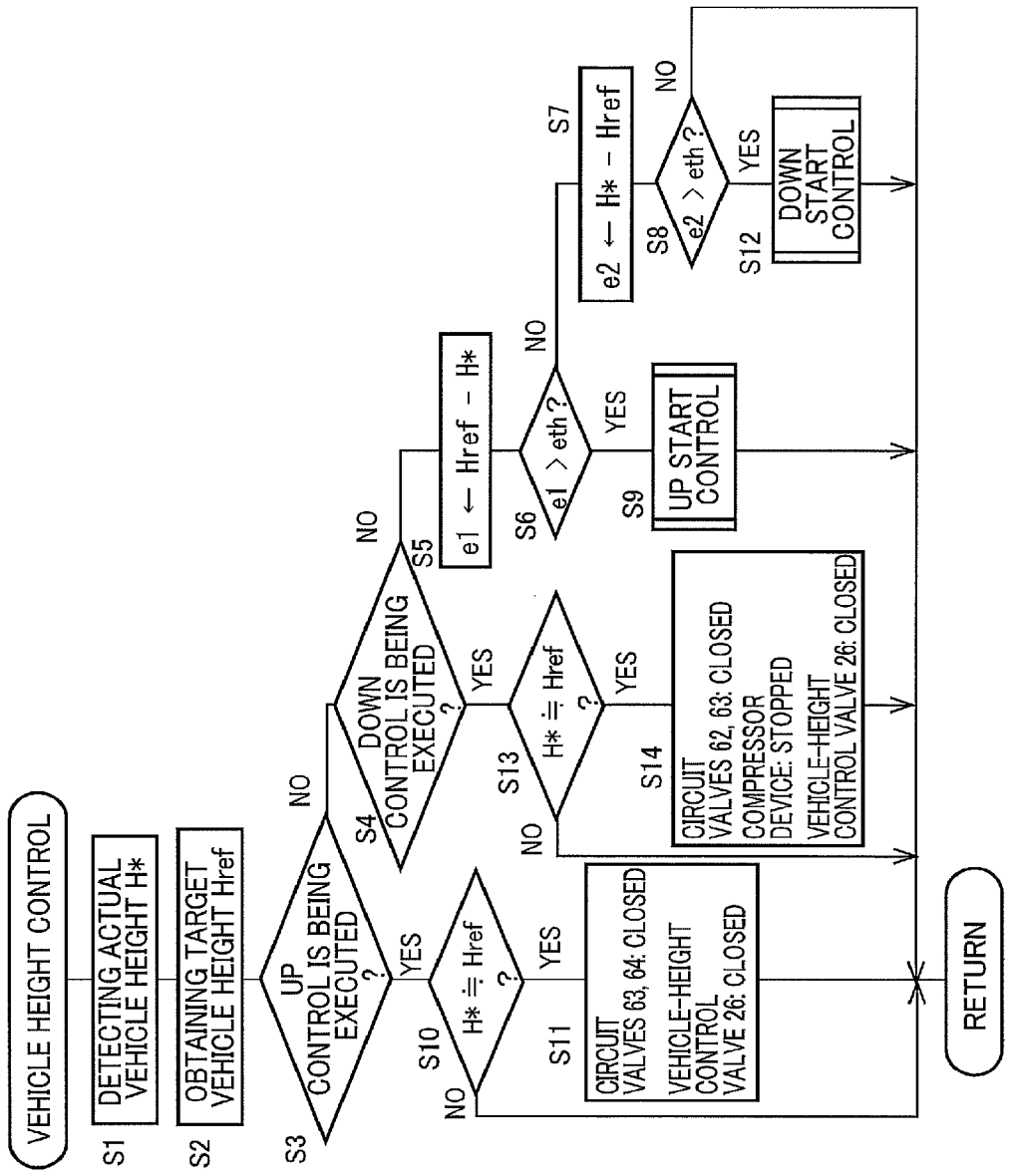
FIG. 7 is a flow chart illustrating a vehicle-height control program stored in a storage of the vehicle-height control ECU.

A vehicle-height control program represented by the flow chart in FIG. 7 is executed each time when a set length of time is elapsed. At S1, each of the vehicle height sensors 93 detects an actual vehicle height H* for a corresponding one of the front left and right and rear left and right wheels. At S2, a target vehicle height Href is obtained. At S3, it is determined whether the up control is being executed. At S4, it is determined whether the down control is being executed. When neither the up control nor the down control is being executed, a deviation e1 is obtained at S5 by subtracting the actual vehicle height H* from the target vehicle height Href. At S6, it is determined whether the deviation e1 is greater than a threshold value eth, that is, it is determined whether the initiating condition for the up control is satisfied. At S7, a deviation e2 is obtained by subtracting the target vehicle height Href from the actual vehicle height H*. At S8, it is determined whether the deviation e2 is greater than the threshold value eth, that is, it is determined whether the initiating condition for the down control is satisfied. When the initiating condition is not satisfied for the up control and the down control, the processings at S1-S8 are repeated.

Figure 8:
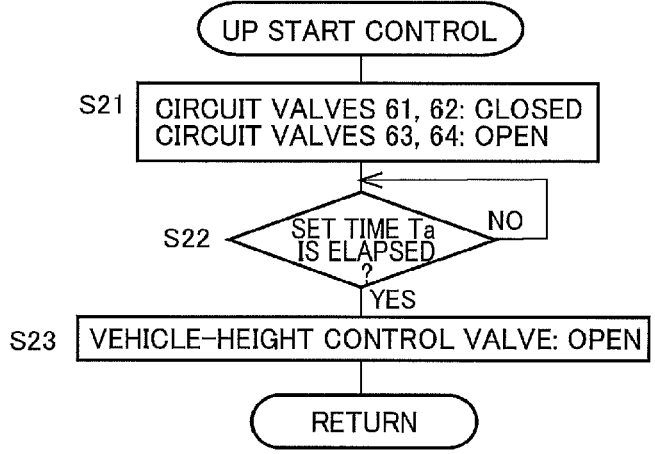
FIG. 8 is a flow chart illustrating a portion (S9) of the vehicle-height control program.

When the initiating condition for the up control is thereafter satisfied, for example, a positive decision (YES) is made at S6, and this flow goes to S9. At S9, the up start control is executed. FIG. 8 illustrates the flow chart representing the up start control. This flow begins with S21 at which the circuit valves 61, 62 are closed, and the circuit valves 63, 64 are opened. As illustrated in FIG. 5, communication between the common passage 22 and the tank 34 is established in the state in which the vehicle-height control valves 26 are closed. As a result, air is supplied from the tank 34 to the common passage 22 to increase the passage pressure Ps. At S22, it is determined whether a length of time elapsed from the establishment of the state illustrated in FIG. 5 has reached a set length of time Ta. When a positive decision (YES) is made at S22, the vehicle-height control valves 26 corresponding to the respective control target wheels are opened at S23. This operation switches the state of the vehicle-height control system to the state illustrated in FIG. 3, so that air is supplied from the tank 34 to the air chambers 19, resulting in increase in the vehicle height of each control target wheel.

Since the state illustrated in FIG. 5 is kept for the set length of time Ta in the up start control, the passage pressure Ps is estimated to become greater than or equal to the chamber pressure Pc. In other words, the set length of time Ta may be determined to a time for which it is possible to estimate that the supply of the air from the tank 34 to the common passage 22 increases the passage pressure Ps to a value greater than or equal to the chamber pressure Pc. Also, since the circuit valves 63, 64 are opened in the up control (including the up start control), the air in the tank 34 is supplied not only to the common passage 22 but also to the fourth passage 66. Thus, the set length of time Ta is preferably set with consideration of a volume of passages through which the air in the tank 34 is the supplied, for example.

The vehicle-height control system may be configured such that the circuit valves 61, 62 are opened in the up control. In this configuration, in the case where the circuit valves 61, 62 are opened in the up control, the tank pressure is supplied to the third passage 65, the compressor 40, and the fourth passage 66. In contrast, in the case where the circuit valves 63, 64 are opened, a discharge valve of the compressor 40 allows the tank pressure to be supplied to the fourth passage 66 but prevents the tank pressure from being supplied to the compressor 40 and the third passage 65. Accordingly, the set length of time Ta is shorter in the case where the circuit valves 63, 64 are opened than in the case where the circuit valves 61, 62 are opened.

When the up start control is finished, the up control is being executed. Thus, a positive decision (YES) is made at S3, and it is determined at S10 whether a terminating condition for the up control is satisfied. Specifically, it is determined whether the actual vehicle height H* has been brought close to the target vehicle height Href. That is, it is determined whether the actual vehicle height H* has fallen within the range determined by the target vehicle height Href and the width of a dead band ΔH. When the actual vehicle height H* has fallen within the range determined by the target vehicle height Href and the width of the dead band ΔH, it is determined that the terminating condition is satisfied, and a positive decision (YES) is made at S10. At S11, the circuit valves 63, 64 and the vehicle-height control valves 26 are closed.

Figure 9:
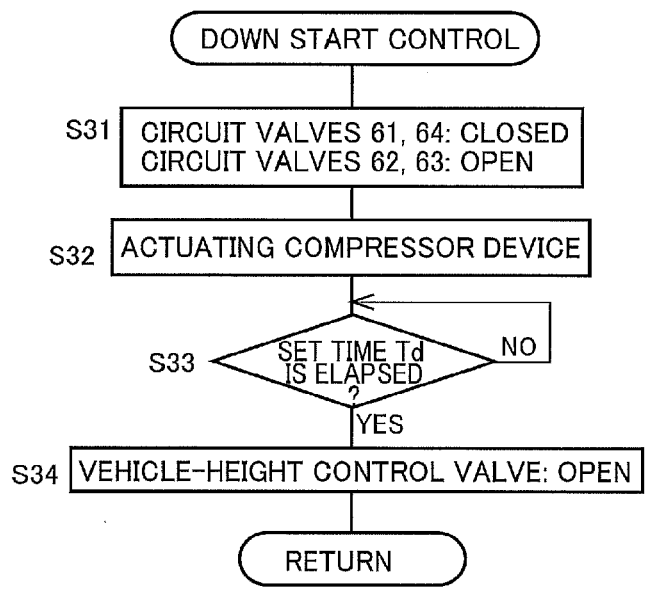
FIG. 9 is a flow chart illustrating another portion (S12) of the vehicle-height control program.

When the initiating condition for the down control is satisfied, a positive decision (YES) is made at S8, and the down start control is executed at S12. FIG. 9 illustrates the flow chart representing the down start control. This flow begins with S31 at which the circuit valves 61, 64 are closed, and the circuit valves 62, 63 are opened in the state in which the vehicle-height control valves 26 are closed. At S32, the compressor device 30 is actuated. As illustrated in FIG. 6, communication between the common passage 22 and the intake-side portion 40a of the compressor 40 is established, and the compressor 40 sucks air from the common passage 22 and supplies the air to the tank 34. This operation lowers the passage pressure Ps. At S33, it is determined whether a length of time elapsed from the establishment of the state illustrated in FIG. 6 has reached a set length of time Td. When a positive decision (YES) is made at S33, the vehicle-height control valves 26 corresponding to the respective control target wheels are opened at S34. This operation switches the state of the vehicle-height control system to the state illustrated in FIG. 4, so that air is discharged from the air chambers 19, resulting in lowering of the vehicle height of each control target wheel.

Since the state illustrated in FIG. 6 is kept for the set length of time Td in the down start control, the passage pressure Ps is estimated to become less than or equal to the chamber pressure Pc. In other words, the set length of time Td may be determined to a time for which it is possible to estimate that the operation of the compressor device 30 lowers the passage pressure Ps to a value less than or equal to the chamber pressure Pc.

When the down start control is finished, the down control is being executed. Thus, it is determined at S13 whether the actual vehicle height H* has been brought close to the target vehicle height Href. That is, it is determined that the actual vehicle height H* has fallen within the range determined by the target vehicle height Href and the width of the dead band ΔH. When a positive decision (YES) is made at S13, it is determined that a terminating condition for the down control as the vehicle height control is satisfied. At S14, the circuit valves 62, 63 are closed, the compressor device 30 is stopped, and the vehicle-height control valves 26 are closed.

Figure 10:
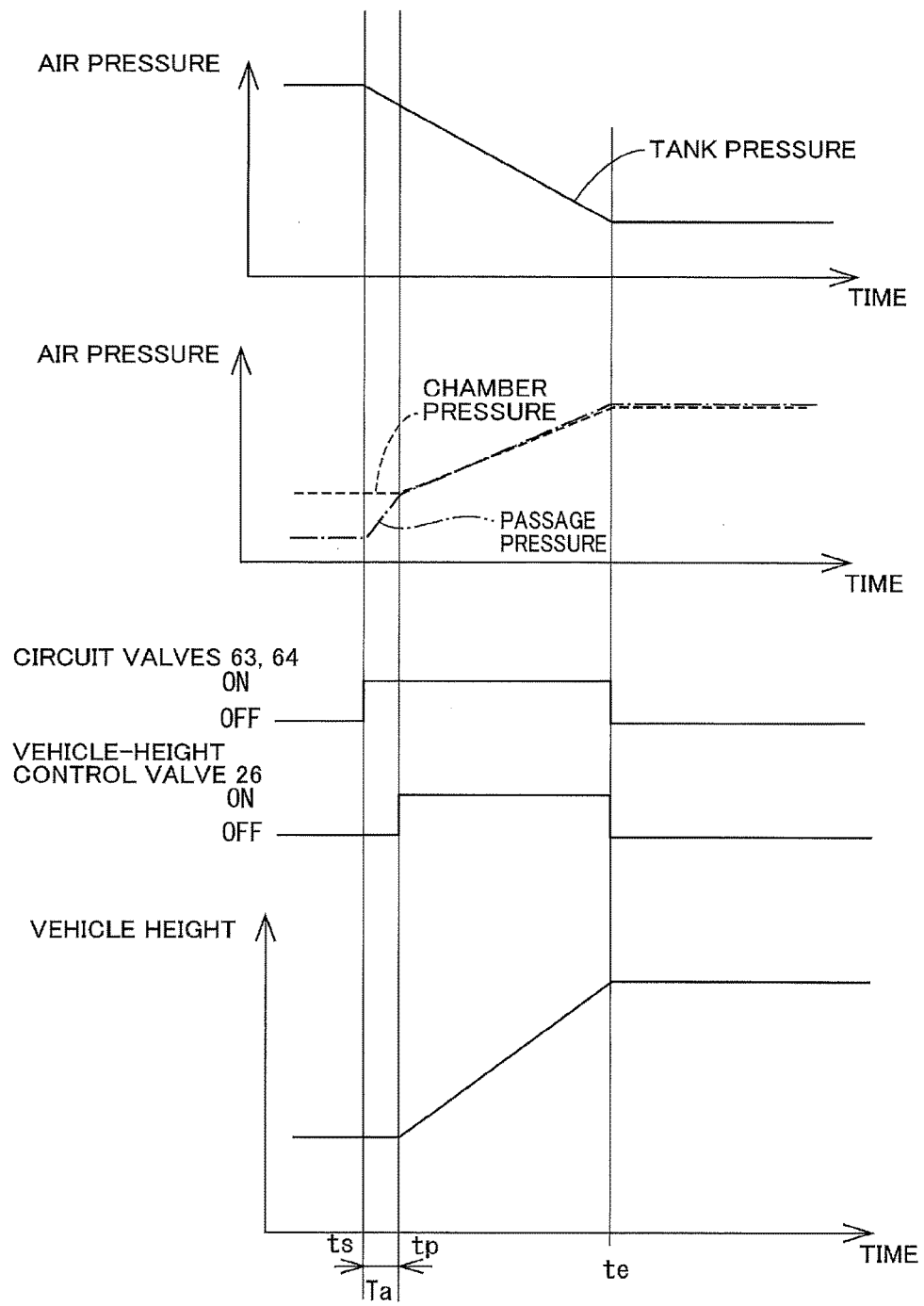
FIG. 10 is a view illustrating operations in the case where the up control is executed in the vehicle-height control system.

In the present embodiment as described above, as illustrated in FIG. 10, when the initiating condition for the up control is satisfied (Time ts), the up start control is executed. The passage pressure Ps is increased because communication between the common passage 22 and the tank 34 is established in the state in which the vehicle-height control valves 26 are closed as illustrated in FIG. 5. Thus, when the set length of time Ta is elapsed (Time tp), and the vehicle-height control valves 26 for the control target wheels are opened, it is difficult for the air to flow out from the air chambers 19 of the air cylinders 2 to the common passage 22, thereby preventing the unintentional lowering of the vehicle height. It is noted that when the terminating condition for the up control is satisfied at Time te, the vehicle-height control valves 26 and the circuit valves 63, 64 are closed.

Figure 11:
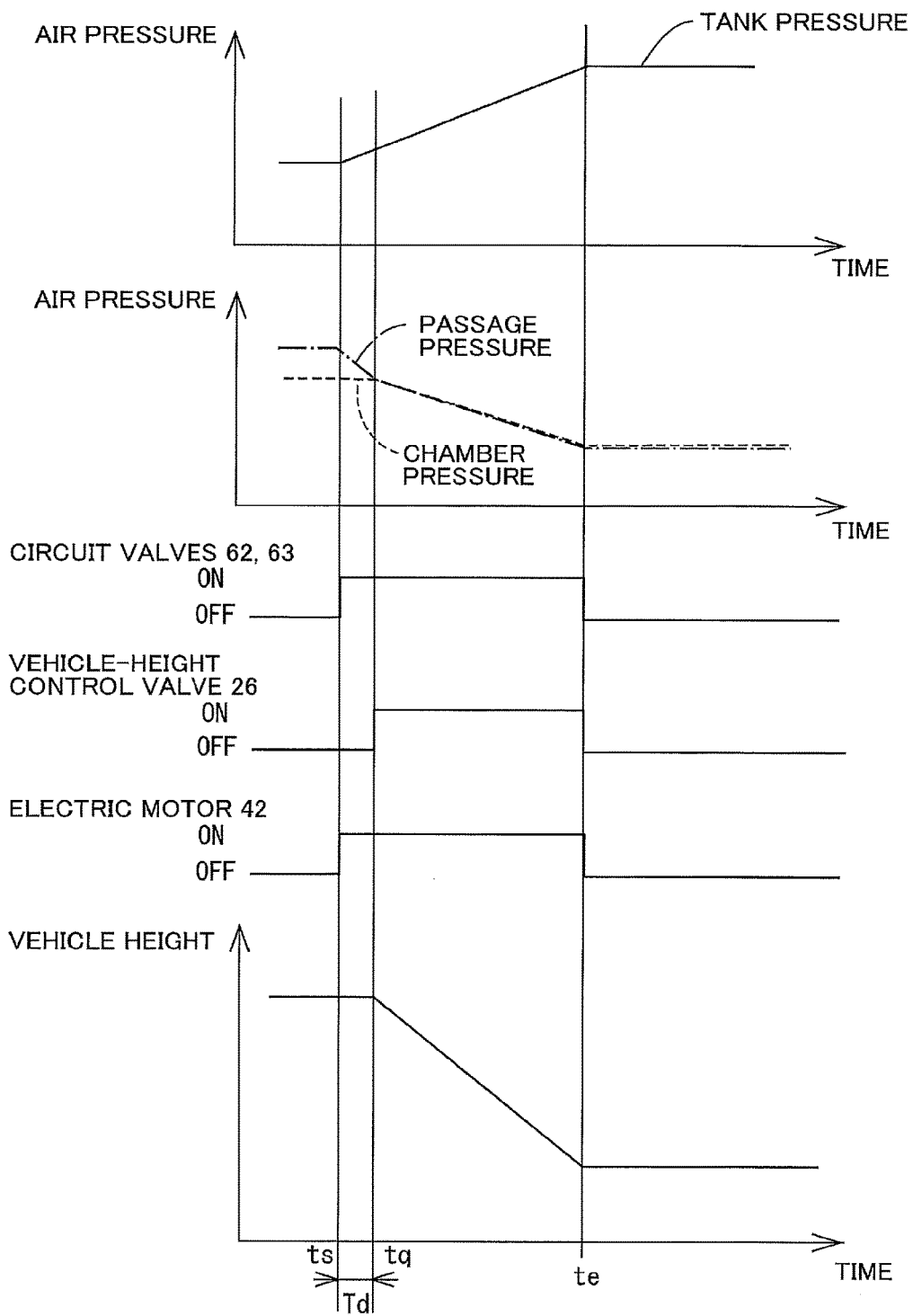
FIG. 11 is a view illustrating operations in the case where the down control is executed in the vehicle-height control system.

As illustrated in FIG. 11, when the initiating condition for the down control is satisfied (Time ts), the down start control is executed. The passage pressure Ps is lowered because communication between the common passage 22 and the intake-side portion 40a of the compressor 40 is established, and the compressor 40 is actuated in the state in which the vehicle-height control valves 26 are closed as illustrated in FIG. 6. Thus, when the set length of time Td is elapsed (Time tq), and the vehicle-height control valves 26 are opened, it is difficult for the air to be supplied from the common passage 22 to the air chambers 19, thereby preventing unintentional increase in the vehicle height.

It is noted that each of the set length of time Ta and the set length of time Td may be a predetermined fixed value and may be a variable value determined as needed. For example, each of the set length of time Ta and the set length of time Td may be longer in the case where a pressure differential between the actual passage pressure Ps detected by the passage pressure sensor 91 and the chamber pressure Pc estimated based on the actual vehicle height H* detected by the vehicle height sensor 93 at the time when the initiating condition for the vehicle height control is satisfied is large than in the case where the pressure differential is small. Also, the set length of time Ta and the set length of time Td may or may not be equal to each other.

In the present embodiment as described above, an actuator-side passage is constituted by the common passage 22, for example. An intake passage is constituted by the third passage 65 and a portion of the first passage 50 which is located on a common-passage side of a position at which the first passage 50 and the third passage 65 are connected to each other, for example. A discharge passage is constituted by the fourth passage 66, the tank passage 48, and a portion of the second passage 52 which is located on a tank-side of a position at which the second passage 52 and the fourth passage 66 are connected to each other, for example. A tank-pressure supply passage is constituted by the tank passage 48 and the second passage 52, for example. An electromagnetic valve device is constituted by the circuit valves 61-64, for example. The circuit valve 62 is one example of an intake-side electromagnetic valve. The circuit valve 63 is one example of a discharge-side electromagnetic valve. Each of the circuit valves 63, 64 is one example of a tank-pressure supply valve. A vehicle height controller is constituted by portions of the vehicle-height control ECU 80 which store and execute the vehicle-height control program represented by the flow chart in FIG. 7, for example. A start controller is constituted by portions of the vehicle height controller which store and execute the processings at S9 and S12.

In the above-described embodiment, the vehicle-height control valves 26 are opened in the up start control after the state illustrated in FIG. 5 is kept for the set length of time Ta. In a modification, the vehicle-height control valves 26 may be opened in the case where the passage pressure Ps detected by the passage pressure sensor 91 becomes higher than an up-start set pressure Psa or in the case where a reduction amount ΔPT of a tank pressure PT detected by the tank pressure sensor 90 becomes larger than a set reduction amount ΔPTa. The up-start set pressure Psa may be a value greater than or equal to a chamber pressure Pch estimated based on the actual vehicle height H* for the control target wheel in the case where the initiating condition for the up control is satisfied, for example. Alternatively, the up-start set pressure Psa may be a value greater than or equal to a standard chamber pressure Pcs that is the chamber pressure Pc in the case where the vehicle height is equal to a standard vehicle height, and a load is a standard load, for example. The set reduction amount ΔPTa may be a value determined based on a value (PT−Pch) obtained by subtracting the chamber pressure Pch estimated based on the actual vehicle height H* detected by the vehicle height sensor 93 provided for the control target wheel, from the tank pressure PT detected by the tank pressure sensor 90 in the case where the initiating condition for the up control is satisfied, for example.

Figure 14:
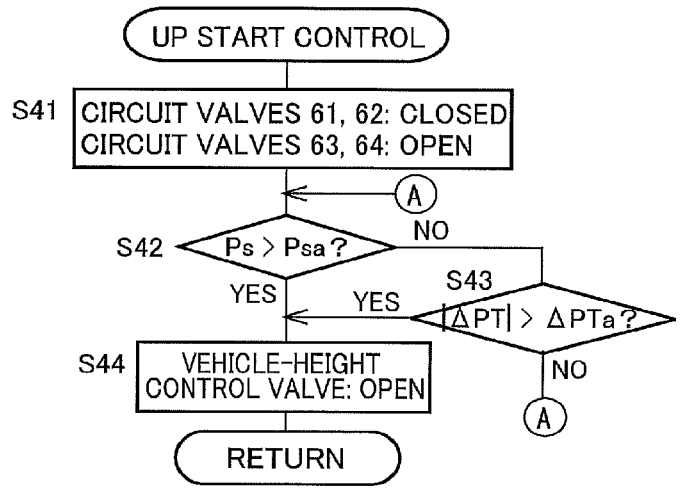
FIG. 14 is a flow chart illustrating a modification of the portion (S9) of the vehicle-height control program.

FIG. 14 is a flow chart illustrating one example of this case. This flow begins with S41 at which the circuit valves 61, 62 are closed, and the circuit valves 63, 64 are opened, so that the state illustrated in FIG. 5 is established. At S42, it is determined whether the passage pressure Ps detected by the passage pressure sensor 91 is higher than the up-start set pressure Psa. At S43, the reduction amount ΔPT of the tank pressure detected by the tank pressure sensor 90 is larger than the set reduction amount ΔPTa. When a positive decision (YES) is made at S42 or S43, the vehicle-height control valves 26 are opened at S44.

In the present embodiment as described above, it is possible to make it more difficult for air to be discharged from the air chambers 19 to the common passage 22 at the start of the up control. Accordingly, it is possible to prevent unintentional lowering of the vehicle height, leading to the smooth up control.

Likewise, the vehicle-height control valves 26 may be opened in the down start control in the where the passage pressure Ps detected by the passage pressure sensor 91 becomes lower than a down-start set pressure Psd in the state in FIG. 6 or in the where an increase amount ΔPT of the tank pressure detected by the tank pressure sensor 90 becomes larger than a set increase amount ΔPTd in the state in FIG. 6. The down-start set pressure Psd may be a value less than or equal to the chamber pressure Pch for the control target wheel or less than or equal to the standard chamber pressure Pcs in the case where the initiating condition for the down control is satisfied, for example. The set increase amount ΔPTd may be a value determined based on a value (PT−Pch) obtained by subtracting the chamber pressure Pch estimated based on the actual vehicle height H* for the control target wheel, from the tank pressure PT detected by the tank pressure sensor 90 in the case where the initiating condition for the down control is satisfied, for example.

Figure 15:
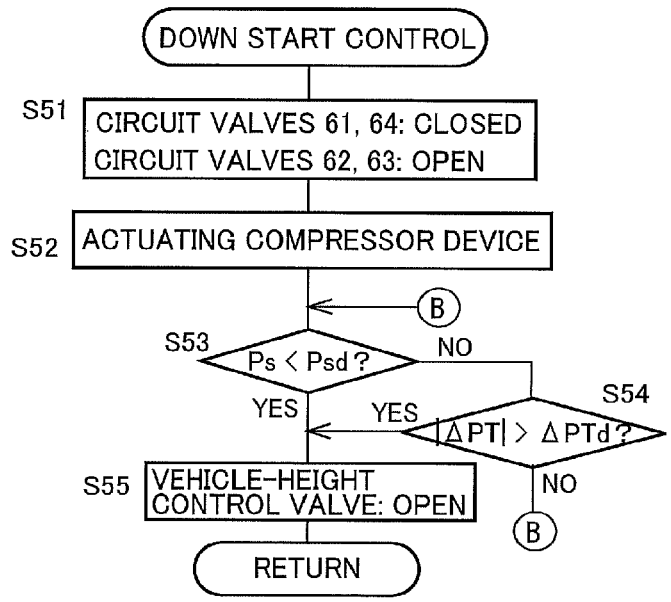
FIG. 15 is a flow chart illustrating a modification of said another portion (S12) of the vehicle-height control program.

FIG. 15 is a flow chart illustrating one example of this case. This flow begins with S51 at which the circuit valves 61, 64 are closed, and the circuit valves 62, 63 are opened. At S52, the compressor device 30 is actuated, so that the state illustrated in FIG. 6 is established. At S53, it is determined whether the passage pressure Ps is lower than the down-start set pressure Psd. At S54, it is determined whether the increase amount ΔPT of the tank pressure is larger than the set increase amount ΔPTd. When a positive decision (YES) is made at S53 or S54, the vehicle-height control valves 26 are opened at S55.

In the present embodiment as described above, it is possible to make it more difficult for air to be supplied from the common passage 22 to the air chambers 19 at the start of the down control. Accordingly, it is possible to prevent unintentional increase in the vehicle height, leading to the smooth down control.

It is noted that each of the set reduction amount ΔPTa and the set increase amount ΔPTd may be a predetermined fixed value and may be a variable value. The set reduction amount ΔPTa and the set increase amount ΔPTd may or may not be equal to each other. The vehicle-height control system may be configured such that all the circuit valves 61-64 are opened in the up control, or such that the circuit valves 63, 64 are closed, and the circuit valves 61, 62 are opened in the up control, or such that the circuit valves 62, 63 are closed, the circuit valves 61, 64 are opened, and the compressor device 30 is actuated in the up control. Likewise, the vehicle-height control system may be configured such that all the circuit valves 61-64 are opened in the up start control, such that the circuit valves 63, 64 are closed, and the circuit valves 61, 62 are opened in the up start control, or such that the circuit valves 62, 63 are closed, the circuit valves 61, 64 are opened, and the compressor device 30 is actuated the up start control. In this case, the tank 34 and the compressor 40 are communicated with the common passage 22. It is to be understood that the disclosure is not limited to the details of the illustrated embodiment and modifications, but may be embodied with various changes and modifications, which may occur to those skilled in the art, without departing from the spirit and scope of the disclosure.

Claimable Inventions

There will be described inventions that are claimable in the present application.

(1) A vehicle-height control system, comprising:

a fluid supply and discharge device comprising a compressor configured to suck fluid, and a tank configured to store the fluid;

an actuator-side passage connected to the fluid supply and discharge device;

a vehicle-height control actuator provided for a wheel and connected to the actuator-side passage via a vehicle-height control valve; and a vehicle height controller configured to control a vehicle height for the wheel by controlling the fluid supply and discharge device and the vehicle-height control valve to control supply and discharge of the fluid in the vehicle-height control actuator, wherein the vehicle height controller comprises a start controller configured to open the vehicle-height control valve after establishing communication between the actuator-side passage and at least one of the tank and the compressor in a state in which the vehicle-height control valve is closed at a start of control of the vehicle height.

(2) The vehicle-height control system according to the above form (1), wherein the start controller is configured to open the vehicle-height control valve after a state in which the vehicle-height control valve is closed, and the actuator-side passage and the at least one of the tank and the compressor communicate with each other is kept for greater than or equal to a set length of time.

The set length of time in the case where up control for increasing a vehicle height is executed and the set length of time in the case where down control for lowering the vehicle height is executed may or may not be equal to each other.

(3) The vehicle-height control system according to the above form (1) or (2), wherein the fluid supply and discharge device comprises an electromagnetic valve device comprising at least one electromagnetic valve provided between the actuator-side passage and the at least one of the tank and the compressor, and wherein the start controller is configured to open at least one of the at least one electromagnetic valve of the electromagnetic valve device in a state in which the vehicle-height control valve is closed.

(4) The vehicle-height control system according to the above form (3), wherein the vehicle height controller is configured to execute up control for increasing the vehicle height, wherein the fluid supply and discharge device comprises a tank-pressure supply passage connecting the tank and the actuator-side passage to each other, wherein the electromagnetic valve device comprises at least one tank-pressure supply valve provided on the tank-pressure supply passage, and wherein the start controller is configured to open the at least one tank-pressure supply valve and establish communication between the actuator-side passage and the tank in the state in which the vehicle-height control valve is closed at a start of the up control.

(5) The vehicle-height control system according to the above form (4), further comprising a passage pressure sensor provided on the actuator-side passage and configured to detect a passage pressure that is a pressure of the fluid in the actuator-side passage, wherein the start controller is configured to open the vehicle-height control valve when the passage pressure detected by the passage pressure sensor becomes greater than an up-start set pressure in a state in which the vehicle-height control valve is closed, and the at least one tank-pressure supply valve is open.

(6) The vehicle-height control system according to the above form (4) or (5), further comprising a tank pressure sensor configured to detect a tank pressure that is a pressure of the fluid stored in the tank, wherein the start controller is configured to open the vehicle-height control valve when an amount of reduction of the tank pressure detected by the tank pressure sensor becomes greater than a set reduction amount in a state in which the vehicle-height control valve is closed, and the at least one tank-pressure supply valve is open.

(7) The vehicle-height control system according to any one of the above forms (3) through (6), wherein the vehicle height controller is configured to execute down control for lowering the vehicle height, wherein the fluid supply and discharge device comprises an intake passage connecting an intake-side portion of the compressor and the actuator-side passage to each other, wherein the electromagnetic valve device comprises at least one intake-side electromagnetic valve provided on the intake passage, and wherein the start controller is configured to open the at least one intake-side electromagnetic valve and actuate the compressor in the state in which the vehicle-height control valve is closed at the start of the down control.

The actuator-side passage is connected to an intake-side portion of the compressor. The fluid in a portion of the actuator-side passage which is nearer to the fluid supply and discharge device than the vehicle-height control valve is sucked by the compressor, resulting in lower fluid pressure. The fluid sucked by the compressor may be transferred back to the tank and may be discharged to the atmosphere.

(8) The vehicle-height control system according to the above form (7), further comprising a passage pressure sensor provided on the actuator-side passage and configured to detect a passage pressure that is a pressure of the fluid in the actuator-side passage, wherein the start controller is configured to open the vehicle-height control valve when the passage pressure detected by the passage pressure sensor becomes less than a down-start set pressure in a state in which the vehicle-height control valve is closed, the at least one intake-side electromagnetic valve is open, and the compressor is being operated.

(9) The vehicle-height control system according to the above form (7) or (8), wherein the fluid supply and discharge device comprises:
an intake passage connecting an intake-side portion of the compressor and the actuator-side passage to each other; and
a discharge passage connecting the tank and a discharge-side portion of the compressor to each other, wherein the electromagnetic valve device comprises: at least one intake-side electromagnetic valve provided on the intake passage; and at least one discharge-side electromagnetic valve provided on the discharge passage, and wherein the start controller is configured to close the vehicle-height control valve, open the at least one intake-side electromagnetic valve and the at least one discharge-side electromagnetic valve, and actuate the compressor.

(10) The vehicle-height control system according to the above form (9), further comprising a tank pressure sensor configured to detect a tank pressure that is a pressure of the fluid stored in the tank, wherein the start controller is configured to open the vehicle-height control valve when an amount of increase in the tank pressure detected by the tank pressure sensor becomes greater than a set increase amount in a state in which the vehicle-height control valve is closed, the at least one intake-side electromagnetic valve and the at least one discharge-side electromagnetic valve are open, and the compressor is being operated.

(11) The vehicle-height control system according to the above form (3), wherein the vehicle height controller is configured to execute up control for increasing the vehicle height, wherein the fluid supply and discharge device comprises: a compressor-pressure supply passage connecting a discharge-side portion of the compressor and the actuator-side passage to each other; and a tank-pressure intake passage connecting the tank and an intake-side portion of the compressor to each other, wherein the electromagnetic valve device comprises: at least one compressor-pressure supply valve provided on the compressor-pressure supply passage; and at least one tank-pressure intake-side electromagnetic valve provided on the tank-pressure intake passage, and wherein the start controller is configured to open the at least one compressor-pressure supply valve and the at least one tank-pressure intake-side electromagnetic valve to establish communication between the actuator-side passage and each of the tank and the discharge-side portion of the compressor in the state in which the vehicle-height control valve is closed at a start of the up control.

The compressor-pressure supply passage is constituted by the fourth passage 66 and a portion of the second passage 52 which is located on a common-passage side of a position at which the second passage 52 and the fourth passage 66 are connected to each other, for example. The tank-pressure intake passage is constituted by the tank passage 48, the third passage 65, and a portion of the first passage 50 which is located on a tank-side of a position at which the third passage 65 and the first passage 50 are connected to each other, for example. The compressor-pressure supply valve corresponds to the circuit valve 64. The tank-pressure intake-side electromagnetic valve corresponds to the circuit valve 61. The technical feature in the form (5) may be incorporated into the vehicle-height control system according to this form.

(12) The vehicle-height control system according to any one of the above forms (1) through (11), further comprising a plurality of vehicle-height control actuators each as the vehicle-height control actuator, wherein the actuator-side passage comprises a common passage, wherein the plurality of vehicle-height control actuators are connected to the common passage respectively via a plurality of individual passages, and wherein a plurality of vehicle-height control valves each as the vehicle-height control valve are respectively provided on the plurality of individual passages.

It is possible to consider that the actuator-side passage includes the common passage or includes the common passage and portions of the individual passages which are located on a common-passage side of the respective vehicle-height control valves, for example.

What is claimed is:

1. A vehicle-height control system, comprising:
   a fluid supply and discharge device comprising a compressor configured to suck fluid, and a tank configured to supply the fluid;
   an actuator-side passage connected to the fluid supply and discharge device;
   a vehicle-height control actuator provided for a wheel and connected to the actuator-side passage via a vehicle-height control valve; and
   a vehicle height controller configured to control a vehicle height for the wheel by controlling the fluid supply and discharge device and the vehicle-height control valve to control supply and discharge of the fluid in the vehicle-height control actuator,
   wherein the fluid supply and discharge device further comprises:
      a tank-pressure supply passage connecting the tank and the actuator-side passage to each other,
      an intake passage connecting an intake-side portion of the compressor and the actuator-side passage to each other, a portion of the intake passage being parallel to a portion of the tank-pressure supply passage,
      a tank-pressure supply valve provided on the portion of the tank-pressure supply passage which is parallel to the portion of the intake passage, and
      an intake-side electromagnetic valve provided on the portion of the intake passage which is parallel to the portion of the tank-pressure supply passage, and
   wherein the vehicle height controller is configured to
      close the vehicle-height control valve and open one of the tank-pressure supply valve or the intake-side electromagnetic valve to establish communication between the actuator-side passage and at least one of the tank and the compressor at a start of control of the vehicle height,
      open the vehicle-height control valve, which is in a state in which the vehicle-height control valve is closed, after the actuator-side passage and the at least one of the tank and the compressor have communicated with each other for a set length of time, and
      close the vehicle-height control valve and close the one of the tank-pressure supply valve or the intake-side electromagnetic valve when a terminating condition of control of the vehicle height is satisfied.

2. The vehicle-height control system according to claim 1,
   wherein the vehicle height controller is configured to execute up control for increasing the vehicle height,
   wherein the vehicle height controller is configured to open the tank-pressure supply valve and establish communication between the actuator-side passage and the tank, and close the vehicle-height control valve at a start of the up control.

3. The vehicle-height control system according to claim 2, further comprising a passage pressure sensor provided on the actuator-side passage and configured to detect a passage pressure that is a pressure of the fluid in the actuator-side passage,
   wherein the vehicle height controller is configured to open the vehicle-height control valve when the passage pressure detected by the passage pressure sensor becomes greater than an up-start set pressure in the state in which the vehicle-height control valve is closed, and the tank-pressure supply valve is open.

4. The vehicle-height control system according to claim 2, further comprising a tank pressure sensor configured to detect a tank pressure that is a pressure of the fluid stored in the tank,
   wherein the vehicle height controller is configured to open the vehicle-height control valve when an amount of reduction of the tank pressure detected by the tank pressure sensor becomes greater than a set reduction amount in the state in which the vehicle-height control valve is closed, and the tank-pressure supply valve is open.

5. The vehicle-height control system according to claim 1,
   wherein the vehicle height controller is configured to execute down control for lowering the vehicle height,
   wherein the vehicle height controller is configured to open the intake-side electromagnetic valve and actuate the compressor, and close the vehicle-height control valve at a start of the down control.

6. The vehicle-height control system according to claim 5,
   wherein the fluid supply and discharge device further comprises a discharge passage connecting the tank and a discharge-side portion of the compressor to each other,
   and a discharge-side electromagnetic valve provided on the discharge passage, and
   wherein the vehicle height controller is configured to close the vehicle-height control valve, open the intake-side electromagnetic valve and the discharge-side electromagnetic valve, and actuate the compressor at the start of the down control.

7. The vehicle-height control system according to claim 6, further comprising:
   a passage pressure sensor provided on the actuator-side passage and configured to detect a passage pressure that is a pressure of the fluid in the actuator-side passage; and
   a tank pressure sensor configured to detect a tank pressure that is a pressure of the fluid stored in the tank,
   wherein the vehicle height controller is configured to open the vehicle-height control valve in at least one of (i) a case where the passage pressure detected by the passage pressure sensor becomes less than a down-start set pressure in a state in which the vehicle-height control valve is closed, the intake-side electromagnetic valve and the discharge-side electromagnetic valve are open, and the compressor is being operated, and (ii) a case where an amount of increase in the tank pressure detected by the tank pressure sensor becomes greater than a set increase amount in the state in which the vehicle-height control valve is closed, the intake-side electromagnetic valve and the discharge-side electromagnetic valve are open, and the compressor is being operated.

8. The vehicle-height control system according to claim 6, wherein the discharge passage includes the portion of the tank-pressure supply passage which is parallel to the portion of the intake passage.

* * * * *